United States Patent
Kielpinski et al.

(10) Patent No.: US 10,367,590 B2
(45) Date of Patent: Jul. 30, 2019

(54) CONCURRENTLY PERFORMING ATTRIBUTE-DEPENDENT OPERATIONS ON OPTICAL SIGNALS

(71) Applicant: Hewlett Packard Enterprise Development LP, Houston, TX (US)

(72) Inventors: David Kielpinski, Palo Alto, CA (US); Jason Pelc, Palo Alto, CA (US); Thomas Van Vaerenbergh, Palo Alto, CA (US); Nikolas Tezak, Palo Alto, CA (US); Gabriel Joe Mendoza, Palo Alto, CA (US); Raymond G. Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 248 days.

(21) Appl. No.: 15/272,616

(22) Filed: Sep. 22, 2016

(65) Prior Publication Data
US 2018/0081388 A1 Mar. 22, 2018

(51) Int. Cl.
*H04B 10/80* (2013.01)
*G06E 3/00* (2006.01)

(52) U.S. Cl.
CPC ........... *H04B 10/801* (2013.01); *G06E 3/008* (2013.01)

(58) Field of Classification Search
CPC ........ H04B 10/801; H04B 10/66; G06E 3/008
See application file for complete search history.

(56) References Cited

U.S. PATENT DOCUMENTS

| 4,403,825 | A  | * | 9/1983  | Tangonan ............ | G02B 6/1245 385/130 |
| 6,151,428 | A  | * | 11/2000 | Vahala ................. | G02F 1/3515 385/11 |
| 6,917,431 | B2 |   | 7/2005  | Soljacic et al. | |
| 7,151,863 | B1 | * | 12/2006 | Bradley ............... | H04N 1/3935 382/299 |

(Continued)

OTHER PUBLICATIONS

[Djo11] Djordjevic S. et al. Fully Reconfigurable Silicon Photonic Lattice Filters With Four Cascaded Unit Cells. IEEE Photon. Tech. Lett. 23, 42 (2011).

(Continued)

*Primary Examiner* — Andrew Jordan
(74) *Attorney, Agent, or Firm* — Hewlett Packard Enterprise Patent Department

(57) ABSTRACT

Examples described herein relate to concurrently performing operations on optical signals. In an example, a method includes providing, to an optical circuit, a first plurality of signals having a first optical property and encoding a first vector. A second plurality of signals is provided to the circuit that encodes a second vector and has a second optical property that is different from the first optical property. A first attribute-dependent operation is performed on the first plurality of signals via the circuit to perform a first matrix multiplication operation on the first vector, and concurrently, a second attribute-dependent operation is performed on the second plurality of signals to perform a second matrix multiplication operation on the second vector. The first matrix multiplication operation and the second matrix multiplication operation are different based on the first optical property being different from the second optical property.

20 Claims, 9 Drawing Sheets

(56) References Cited

U.S. PATENT DOCUMENTS

| | | | |
|---|---|---|---|
| 7,289,221 B2 | 10/2007 | Wang et al. | |
| 7,307,732 B2 | 12/2007 | Beausoleil | |
| 7,916,982 B1* | 3/2011 | Bahuguna | G02F 1/095 385/1 |
| 2003/0011775 A1 | 1/2003 | Soljacic et al. | |
| 2010/0046065 A1* | 2/2010 | Little | G02B 6/12007 359/337.1 |
| 2017/0031101 A1* | 2/2017 | Miller | G02B 6/2935 |
| 2017/0351293 A1* | 12/2017 | Carolan | G02F 3/024 |
| 2018/0081388 A1* | 3/2018 | Kielpinski | H04B 10/801 |

OTHER PUBLICATIONS

[Mil13a] Miller; D.A.B. Self-configuring universal linear optical component. Photon. Res. 1, 1 (2013).
[Mil13b] Miller, D.A.B. Establishing Optimal Wave Communication Channels Automatically. J. Lightwave, Tech. 31, 3987 (2013).
[Rec94] Reck M. et al, Experimental Realization of Any Discrete Unitary Operator. Phys. Rev. Lett. 73, 53 (1994).
[Zhu15] Zhuang, L. et al. Programmable photonic signal processor chip for radiofrequency applications. Optica 2, 854 (2015).

\* cited by examiner

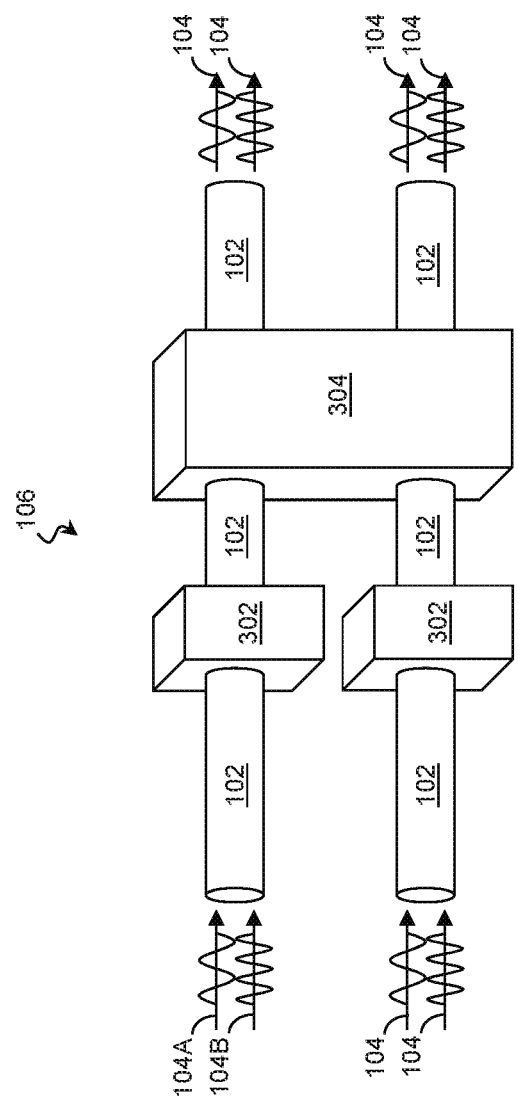

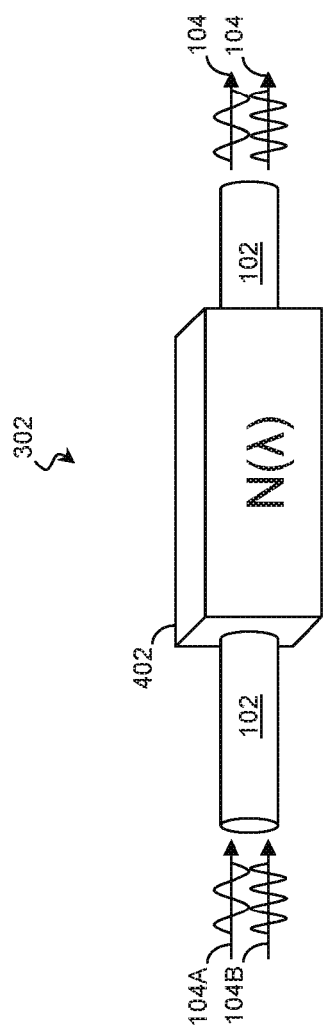
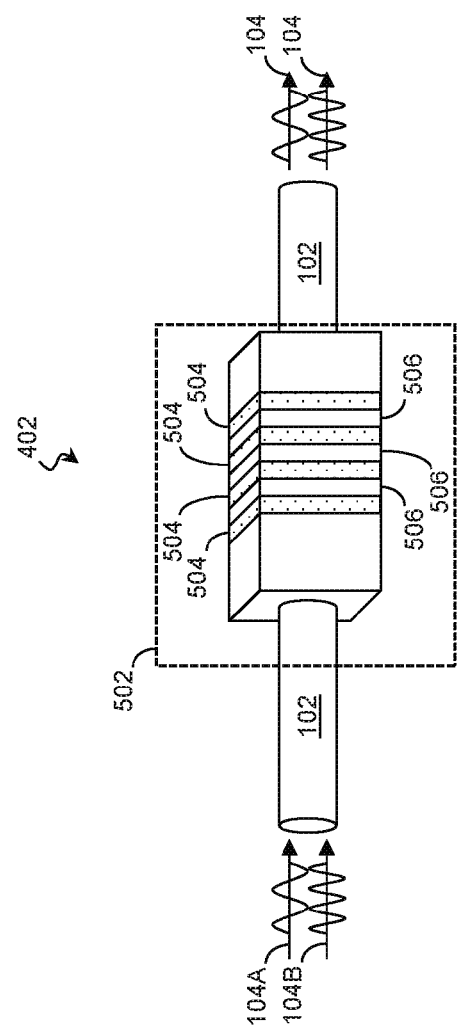

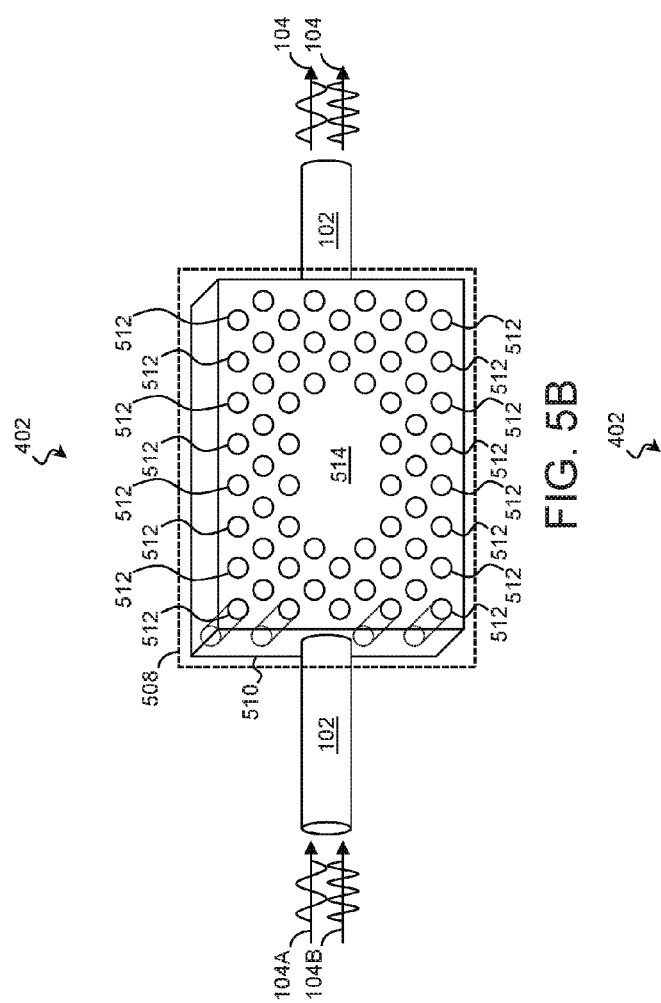
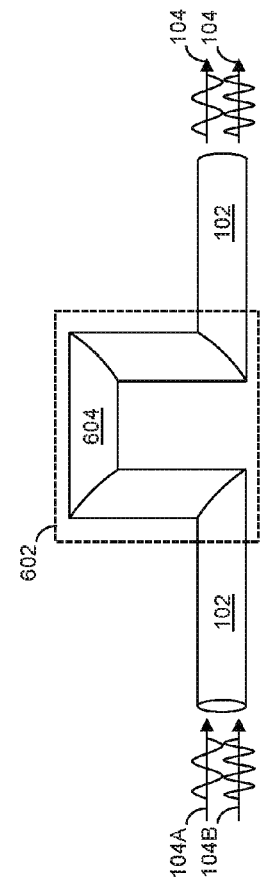
FIG. 5B
FIG. 6A

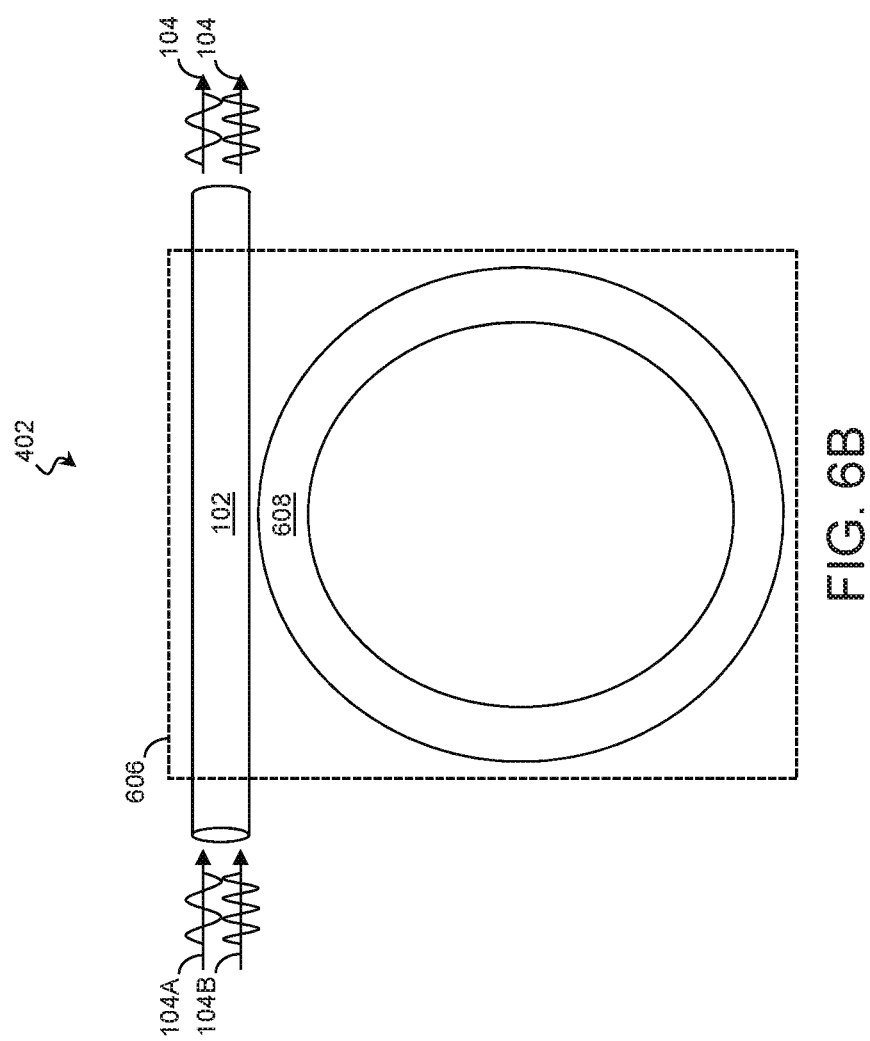

CONCURRENTLY PERFORMING ATTRIBUTE-DEPENDENT OPERATIONS ON OPTICAL SIGNALS

STATEMENT OF GOVERNMENT INTEREST

This invention was made with government support under Contract No. N66001-12-2-4007, awarded by SPAWAR Systems Center Pacific. The government has certain rights in the invention.

BACKGROUND

Matrices are arrays of elements of any suitable size, and these elements may represent data, relationships between data values, transformations to be applied to data, and more. Owing to their flexibility and utility, matrices are used in a wide range of real-world applications. In computing examples, matrices are used to store and manipulate sensor data for controlling automated manufacturing, scientific data for research and modeling, demographic data, other statistical data, and other data types. Matrices are also used extensively in computer graphics. For example, a bitmap is a specific type of matrix in which each entry is a pixel value. As a further example, a digital filter for image processing may be represented as a matrix in which each entry is a transformation to be applied to a portion of an image or frame. A wide body of algebraic operations have been developed to manipulate and analyze matrices and their contents, and because they are utilized with such frequency, computing systems may include dedicated hardware for handling matrices and performing these operations.

BRIEF DESCRIPTION OF THE DRAWINGS

Certain examples are described in the following detailed description with reference to the drawings, of which:

FIG. 3 is a block diagram of an optical circuit according to some examples of the present disclosure.

FIG. 4 is a block diagram of an adjustment element that includes a dispersive element according to some examples of the present disclosure.

FIG. 5A is a block diagram of a dispersive element that includes a photonic crystal according to some examples of the present disclosure.

FIG. 5B is a block diagram of a dispersive element that includes a photonic crystal with a photonic crystal cavity according to some examples of the present disclosure.

FIG. 6A is a block diagram of a dispersive element that includes a delay element according to some examples of the present disclosure.

FIG. 6B is a block diagram of a dispersive element that includes a ring resonator according to some examples of the present disclosure.

DETAILED DESCRIPTION OF SPECIFIC EXAMPLES

Figure 1:
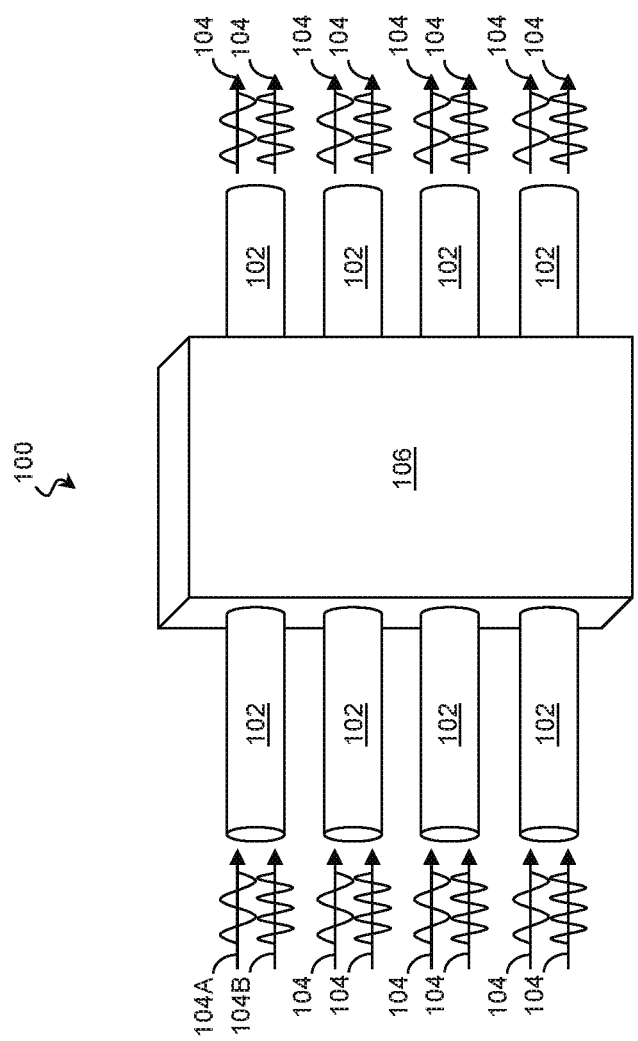
FIG. 1 is a block diagram of a processor according to some examples of the present disclosure.

Many computing processors operate on matrices and matrix data, and for this purpose, a processor may include dedicated circuitry for matrix algebra. It has been determined that some matrix operations, including matrix multiplication, may be performed using circuitry that operates on optical signals (which include visible signals as well as infrared, ultraviolet, and other signals).

For example, values may be encoded in attributes of an optical signal such as amplitude and/or phase. Amplitude and phase changes caused by materials and interactions between signals (e.g., constructive and destructive interference) may be used to perform operations on the values encoded in the signals. One advantage of using optical signals for this purpose is that they propagate extremely quickly and the optical effects that perform the operations are nearly instantaneous.

In some examples, a pair of optical signals with encoded data are provided to an interferometer. The interferometer may include an arrangement of mirrors, beam splitters, phase shifters, beam combiners, and other optical elements to produce various interference patterns between the signals. The interferometer may produce the interference patterns in a pair of output signals that each represent some combination of the input signals. Thus, the interferometer performs an operation akin to a matrix operation on the input signals to produce the output signals. In some examples, the interferometer is manufactured to perform a specific matrix operation. In other examples, the interferometer includes adjustable elements that allow the matrix operation to be controlled by changing the contribution of each input signal to each output signal. By aggregating a network of interferometers, matrix operations may be performed on larger numbers of signals.

It has been determined through careful investigation that it is possible to perform more than one concurrent matrix operation using the same network by encoding different input matrices in optical signals with some distinguishing attribute such as wavelength or polarization. Accordingly, in some examples, the optical circuit performs wavelength-dependent matrix operations on the values encoded in the optical signals. In other words, the optical circuit performs a first operation on a first set of signals because the first set of signals has a first wavelength and a second operation on a second set of signals because the second set of signals has a second wavelength. Both operations may be performed concurrently using the same optical paths for both sets of signals. This concurrent processing may greatly increase the calculation rate and performance of the optical circuit.

In some such examples, the different matrix operations are performed by optical elements that perform an attribute-dependent phase shift or other adjustment. By doing so, these optical elements affect the values encoded in the optical signals, which in turn, changes the mathematical operation performed by the optical circuit based on the signals' distinguishing attribute. In some examples, these attribute-dependent optical elements are standalone elements that are inserted along an optical path. In other examples, they are incorporated into other optical elements such as interferometers.

The circuitry and technique of the present disclosure concurrently perform distinct matrix operations on a plurality of matrices by leveraging the distinguishing attribute of the signals used to encode the matrices. By these mechanisms and others, the present disclosure provides substantial real world improvements to matrix coprocessors. For instance, in many examples, optical circuits perform matrix operations much faster than electrical circuits because of the speed at which optical signals propagate and because the optical effects that perform the operations are nearly instantaneous. Furthermore, the attribute-dependent optical elements enable an optical circuit to operate on multiple matrices concurrently providing even greater performance. Additionally, by processing multiple signal sets using the same optical paths, the computational density (a measure of computations per circuit area) may be dramatically improved.

These examples and others are described with reference to the following figures. Unless noted otherwise, these figures and their accompanying description are non-limiting, and no element is characteristic of any particular example. In that regard, features from one example may be freely incorporated into other examples without departing from the spirit and scope of the disclosure.

Some examples of the technique are described with reference to FIG. 1. FIG. 1 is a block diagram of a processor 100 according to some examples of the present disclosure. The processor 100 includes a set of waveguides 102 that carry optical signals 104 including visible light signals, infrared signals, ultraviolet signals, and other suitable signals to and through an optical circuit 106. The waveguides 102 may include optical fibers, rectangular waveguides, and/or other waveguiding structures. In some examples, a waveguide 102 includes an inner core material such as a semiconductor, silicate or fluoride glass, plastic, or other suitable material and a cladding material surrounding the inner core material. The cladding material may have a higher refractive index than the material of the inner core so that the difference in refractive index channels an optical signal 104 along a length of the waveguide 102 via internal reflection.

The optical signals 104 carried by the waveguide 102 may be used to transmit data. For example, data bits may be encoded in various attributes of a signal 104 such as amplitude, phase, polarization, and/or other suitable attributes including both real and complex attributes. In that regard, a sinusoidal signal 104 may be represented in a complex form as:

$$S(t)=Ae^{i(\omega t+\Phi)}$$

where S(t) is the value of the signal at time t, A is the complex amplitude of the signal, $\omega$ is the frequency of the signal (inversely proportional to the wavelength $\Lambda$), and $\Phi$ is a phase offset of the signal. Accordingly, in some examples, data is encoded in the complex amplitude (A) and/or the phase offset ($\Phi$).

To increase the amount of data transmitted, each waveguide 102 may receive and carry more than one optical signal 104 concurrently (e.g., first optical signal 104A and second optical signal 104B). Individual optical signals 104 may be distinguished by their wavelength, polarization, and/or other attributes or characteristics. Carrying multiple unique optical signals 104 in a single waveguide 102 may be referred to as multiplexing, and any suitable attribute of the optical signals 104 may be used to distinguish the multiplexed signals. In some examples, first optical signal 104A has a first wavelength while second optical signal 104B has a different wavelength.

The optical circuit 106 receives the optical signals 104 as inputs from the waveguide 102 and performs a set of transformations on the signals 104 to produce a set of outputs. In some examples, the optical circuit 106 is a linear circuit for which an input of a given wavelength produces an output with substantially the same wavelength. Additionally or in the alternative, in some examples, the optical circuit 106 is a passive linear circuit for which the total output energy is not greater than the total input energy.

The optical circuit 106 may operate on and thereby modify any suitable attribute of the signals 104 including amplitude, phase, polarization, and/or wavelength. These operations may affect the data encoded in these attributes, and accordingly, the optical circuit 106 may be used to perform various mathematical and/or logical operations on the encoded data. The optical circuit 106 may perform different operations on the multiplexed signals 104 based on their distinguishing attributes, and some examples of using the optical circuit 106 of FIG. 1 to perform matrix operations on optical signal data are described with reference to FIG. 2.

Figure 2:
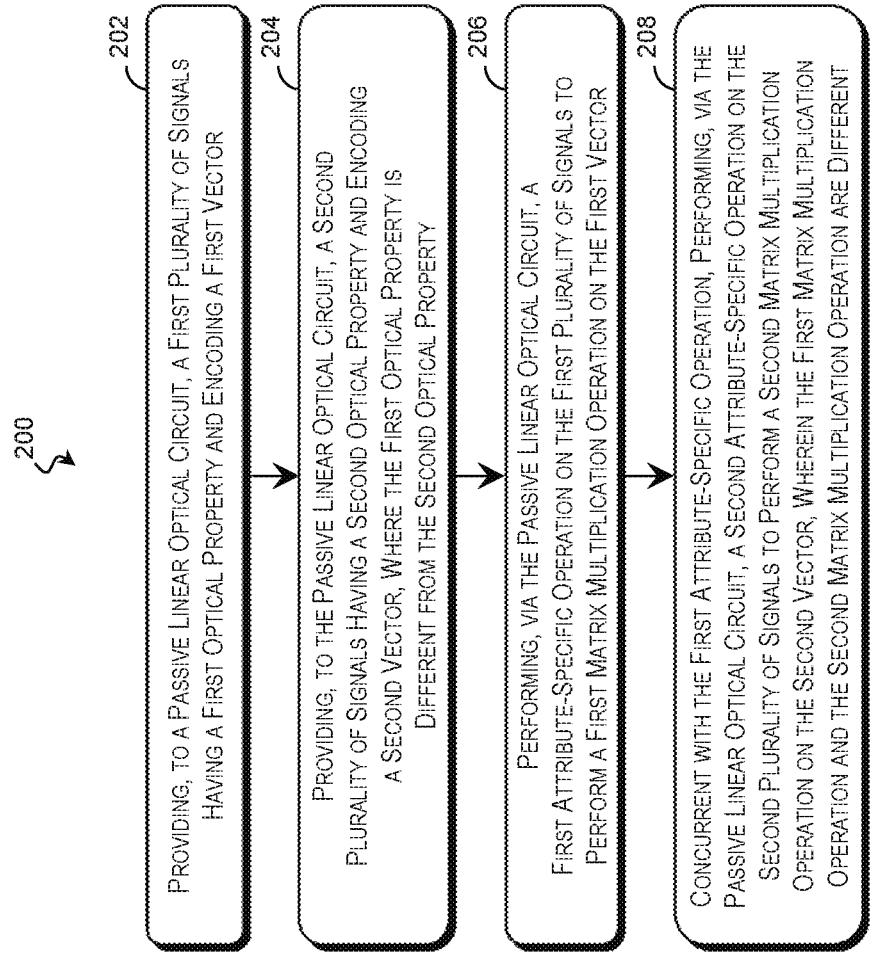
FIG. 2 is a flow diagram of a method of performing concurrent matrix operations according to some examples of the present disclosure.

FIG. 2 is a flow diagram of a method 200 of performing concurrent matrix operations according to some examples of the present disclosure. The description of method 200 is non-limiting, and steps may be added to and omitted from the method 200 without departing from the disclosure. Furthermore, unless noted otherwise, processes of the method 200 may be performed in any order including being performed concurrently by one or more entities.

Referring first to block 202 and to FIG. 1, a first plurality of optical signals 104 (including first signal 104A) is provided to the optical circuit 106 (e.g., a passive linear optical circuit) via a plurality of waveguides 102. The signals of the first plurality of signals 104 may all share a common property such as wavelength and/or polarization so that the first plurality of signals 104 may be multiplexed with other signals. In some examples, the signals of the first plurality have a common wavelength that is different from the wavelength(s) of other signals 104 in the same waveguides 102.

The first plurality of signals 104 may encode values in a signal attribute such as amplitude, phase, polarization, etc., and in some examples, the first plurality of signals 104 encodes a value in the complex amplitude and/or phase of the signal. The values may represent elements of a vector (i.e., a one-dimensional matrix).

Referring to block 204, a second plurality of optical signals 104 (including second signal 104B) is provided to the optical circuit 106 via the same waveguides 102 as the first plurality of signals 104 and may be provided concurrently with the first plurality of signals 104. The signals of the second plurality of signals 104 may be distinguishable from the signals 104 of the first plurality based on any suitable attribute, and in some examples, the signals of the second plurality of signals 104 have a different wavelength from those of the first plurality. Similar to the first plurality, the second plurality of signals 104 encodes values in a signal attribute such as amplitude, phase, polarization, etc., and a vector made up of the values of the second plurality of signals 104 may be independent from the vector of the first plurality of signals 104.

Referring to block 206, the optical circuit 106 performs an attribute-dependent operation on the first plurality of signals 104 in order to perform a matrix operation on the vector encoded therein. As described above, despite receiving the first plurality of signals 104 and the second plurality of signals 104 via the same waveguides 102 and despite processing the signals 104 via the same optical path(s), the optical circuit 106 may perform different operations on the signals based on their distinguishing attributes. In that regard, the optical circuit 106 may perform a first matrix multiplication operation on the first vector. In other words:

$$\begin{bmatrix} O_{A1} \\ O_{A2} \\ \vdots \\ O_{Am} \end{bmatrix} = \begin{bmatrix} A_{1,1} & A_{1,2} & \ldots & A_{1,n} \\ A_{2,1} & A_{2,2} & \ldots & A_{2,n} \\ \vdots & \vdots & \ddots & \vdots \\ A_{m,1} & A_{m,2} & \ldots & A_{m,n} \end{bmatrix} \times \begin{bmatrix} I_{A1} \\ I_{A2} \\ \vdots \\ I_{An} \end{bmatrix}$$

where $I_{A1}$ through $I_{An}$ are the vector values of the first plurality of input signals 104, $O_{A1}$ through $O_{Am}$ are vector values of a first plurality of output signals 104, and $A_{1,1}$ through $A_{m,n}$ are matrix coefficients applied by the optical circuit 106.

As described in detail below, performing the first attribute-dependent operation may include applying operations such as wavelength-specific phase or amplitude adjustment to some or all of the first plurality of signals 104. In various examples below, these operations are performed by dispersive elements, optical delay elements, photonic crystals, and/or interferometers.

Referring to block 208, the optical circuit 106 also performs a second attribute-dependent operation on the second plurality of signals 104 in order to perform a matrix operation on the second vector encoded in the second plurality. This may be performed concurrently with the operation of block 206. Despite receiving the first plurality of signals 104 and the second plurality of signals 104 via the same waveguides 102 and despite processing the signals via the same optical path(s), the optical and mathematical operations performed on the second plurality of signals 104 may be different from those applied to the first plurality. The set of operations performed on the second plurality of signals 104 may also be represented as a matrix multiplication. For example:

$$\begin{bmatrix} O_{B1} \\ O_{B2} \\ \vdots \\ O_{Bm} \end{bmatrix} = \begin{bmatrix} B_{1,1} & B_{1,2} & \ldots & B_{1,n} \\ B_{2,1} & B_{2,2} & \ldots & B_{2,n} \\ \vdots & \vdots & \ddots & \vdots \\ B_{m,1} & B_{m,2} & \ldots & B_{m,n} \end{bmatrix} \times \begin{bmatrix} I_{B1} \\ I_{B2} \\ \vdots \\ I_{Bn} \end{bmatrix}$$

where $I_{B1}$ through $I_{Bn}$ are the vector values of the second plurality of input signals 104, $O_{B1}$ through $O_{Bm}$ are vector values of a second plurality of output signals 104, and $B_{1,1}$ through $B_{m,n}$ are matrix coefficients applied by the optical circuit 106. It is noted that the coefficients $B_{1,1}$ through $B_{m,n}$ may be different from the coefficients $A_{1,1}$ through $A_{m,n}$ of block 206 above. In this way, the method 200 provides a technique for concurrently processing multiple vectors where different matrix operations are applied to the different vectors.

Similar to the first attribute dependent operation, performing the second attribute-dependent operation may include applying operations such as wavelength-specific phase or amplitude adjustment to some or all of the second plurality of signals 104. In various examples below, these operations are performed by dispersive elements, optical delay elements, photonic crystals, and/or interferometers.

Figure 7:
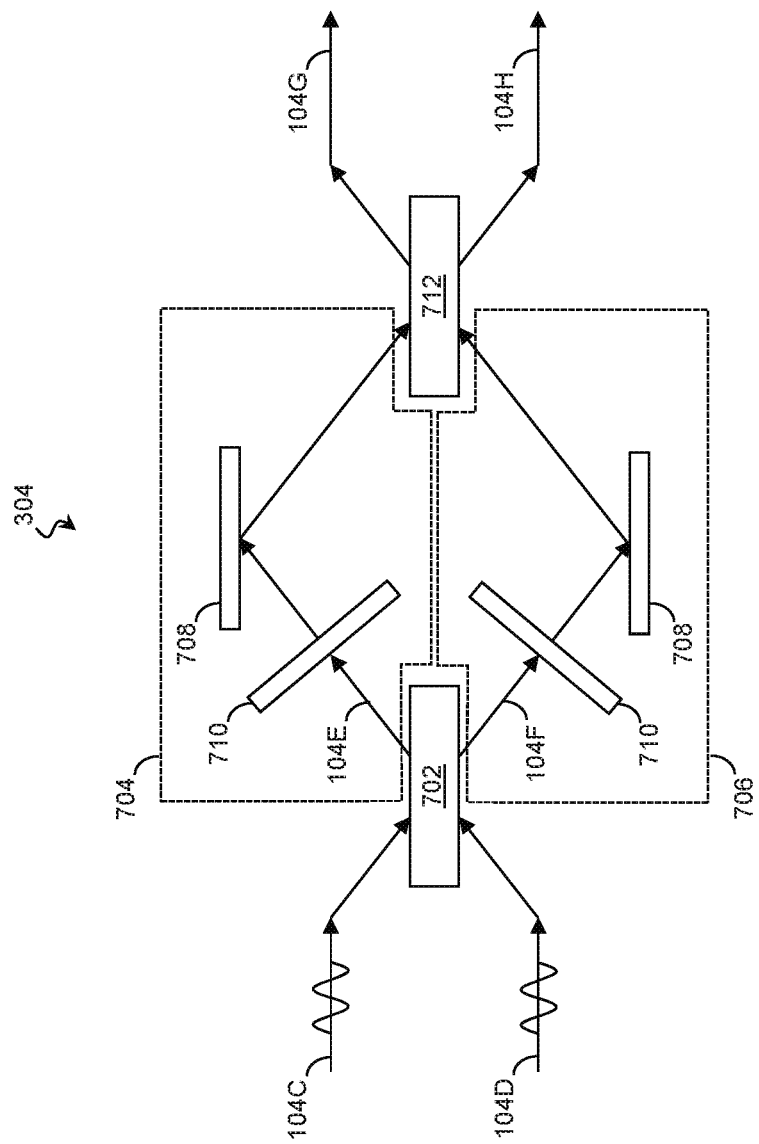
FIG. 7 is a block diagram of an interferometer according to some examples of the present disclosure.

Further examples of the optical circuit 106 for performing matrix operations are described with reference to FIGS. 3-7. FIG. 3 is a block diagram of an optical circuit 106 according to some examples of the present disclosure. The optical circuit 106 is suitable for use as the optical circuit 106 of FIG. 1 and elements of the optical circuit 106 may perform the processes of method 200 of FIG. 2. FIG. 4 is a block diagram of an adjustment element that includes a dispersive element according to some examples of the present disclosure. FIG. 5A is a block diagram of a dispersive element that includes a photonic crystal according to some examples of the present disclosure. FIG. 5B is a block diagram of a dispersive element that includes a photonic crystal with a photonic crystal cavity according to some examples of the present disclosure. FIG. 6A is a block diagram of a dispersive element that includes a delay element according to some examples of the present disclosure. FIG. 6B is a block diagram of a dispersive element that includes a ring resonator according to some examples of the present disclosure. FIG. 7 is a block diagram of an interferometer according to some examples of the present disclosure. The adjustment element of FIG. 4, the dispersive elements of FIGS. 5A-6B, and the interferometer 304 of FIG. 7 are each suitable for use in the optical circuit 106 of FIGS. 1 and 3.

Turning first to FIG. 3, the optical circuit 106 includes any number of waveguides 102 (of which two are shown) configured to receive and carry a plurality of optical signals 104, including a first optical signal 104A and a second optical signal 104B, substantially as described above. In some examples, a plurality of the optical signals 104 are multiplexed in a single waveguide 102, and the multiplexed signals 104 are distinguishable by a property such as frequency and/or polarization. Accordingly, in one such example, the first optical signal 104A is multiplexed with and has a different wavelength than the second optical signal 104B.

The signals 104 may have data encoded in a property of the respective signal 104, such as the amplitude and/or phase, and the data may represent entries of plurality of vectors. For example, a first set of optical signals 104, including the first optical signal 104A, having a first wavelength may represent a first vector, while a second set of optical signals 104, including the second optical signal 104B, having a second wavelength may represent a second vector. The optical circuit 106 may perform various mathematical operations on the encoded vectors substantially as described above. In that regard, the optical circuit 106 may perform different mathematical matrix operations on the vectors based on the distinguishing attribute of the signals 104. To perform these operations, the optical circuit 106 includes various optical devices such as attribute-dependent adjustment elements 302 and/or interferometers 304.

With respect to the attribute-dependent adjustment elements 302, as noted above, the multiplexed signals 104 may represent and encode independent vectors. In order to apply different mathematical operations to the different input vectors in blocks 206 and 208, for example, the optical circuit 106 may include attribute-dependent adjustment elements 302 that affect the first signal 104A differently than the second signal 1046 based on the distinguishing attribute such as wavelength or polarization. The adjustment elements 302 may modify any suitable aspect of the signals 104 such as amplitude and/or phase to thereby perform a mathematical operation on the encoded values.

Accordingly, in some such examples, the attribute-dependent adjustment elements 302 apply a phase adjustment to an incoming signal that varies based on the wavelength of the signal so that the first signal 104A has a different amount of phase adjustment applied than the second signal 104B. Additionally or in the alternative, in some examples, the attribute-dependent adjustment elements 302 include a tunable loss mechanism that affects the amplitude of an incoming signal based on the wavelength of the signal so that the first signal 104A has a different change in amplitude applied than the second signal 104B. Each attribute-dependent adjustment element 302 may apply an independent adjustment to the input signals, and in an example, some adjustment elements 302 apply different adjustments to an input signal 104 with a given wavelength than other adjustment elements 302 in the same optical circuit 106. Furthermore, some waveguides 102 may be free of any attribute-dependent adjustment element 302.

Referring to FIG. 4, in some examples, the adjustment element 302 includes a dispersive element 402 optically coupled between a set of waveguides 102. The dispersive element 402 may be configured to have a specific optical response that varies based on a property of the input signal. For example, the dispersive element 402 may have different optical density, reflectivity, transmissivity, and/or absorptivity for a first signal 104A than for a second signal 104B based on the respective signal wavelengths, polarizations, and/or other properties. In this way, the dispersive element 402 may perform an attribute-dependent adjustment to the amplitudes, phases, polarizations, and/or other properties of the signals. When incorporated into an optical circuit 106, the circuit 106 may perform different mathematical operations on sets of signals based on the distinguishing attributes. Examples of suitable dispersive elements 402 include photonic crystals, optical delay elements, ring resonators photonic crystal cavities, Fabry-Pérot etalons, other resonators, and/or other dispersive devices. Some of these examples of dispersive elements 402 are described with reference to FIGS. 5A, 5B, 6A, and 6B.

Referring to FIG. 5A, in some examples, the dispersive element 402 includes a photonic crystal 502 coupled between the waveguides 102. In various examples, the photonic crystal 502 has a structure and composition such that an optical property of the photonic crystal 502 varies according to an attribute of an input optical signal and is different for a first signal 104A than for a second signal 104B. For this purpose, the photonic crystal 502 may include alternating material layers, such as layers 504 and layers 506. In some examples, the material layers include metals, metal oxides, semiconductors and/or semiconductor dielectrics, and in one example, layers 504 include a metal oxide (e.g., TiO), while layers 506 include a semiconductor oxide (e.g., SiO). The layers 504 and 506 may be formed to any suitable thickness, and the attribute-specific properties of the photonic crystal 502 may be determined by the thickness, composition, and number of the material layers 504 and 506.

Referring next to FIG. 5B, an alternative structure for a photonic crystal that includes a photonic crystal cavity is shown. Similar to the example of FIG. 5A, the photonic crystal 508 includes a periodic arrangement of material regions 510 and 512. The materials of the photonic crystal 508 are selected so that material regions 510 and 512 have different optical properties. In some examples, region 510 represents a material with a relatively higher index of refraction, while regions 512 represent holes of a relatively lower index material. In some examples, region 510 represents a material with a relatively lower index of refraction, while regions 512 represent rods of a relatively higher index material. In various examples, regions 510 and 512 include metals, metal oxides, semiconductors, semiconductor dielectrics, as well as air, and/or other suitable materials.

While the holes and/or rods of regions 512 may be arranged in an orderly manner, irregularities may also be used to control the optical response of the photonic crystal 508. In the illustrated examples, the photonic crystal 508 includes a cavity 514 where a subset of the regions 512 are omitted. A cavity 514 refers to examples where a rod of a relatively higher index material is omitted and to examples where a hole of a relatively lower index material is omitted. In such examples, the cavity 514 and/or the materials of regions 510 and 512 are configured so that the photonic crystal 508 has a specific optical response that varies based on a property of the input signal such as a wavelength, polarization, and/or other property. For example, a phase adjustment applied to a first signal 104A may be different from that applied to a second signal 104B based on the differences in wavelength between the two signals.

Referring to FIG. 6A, in some examples, the dispersive element 402 includes an optical delay element 602 coupled between a set of waveguides 102. Aspects of the optical delay element 602 such as length and composition may be selected to produce phase shifts and/or amplitude changes that depend on an attribute of the input signals. The optical delay element 602 may include an optical guide extension 604 that, in turn, includes optical fibers, rectangular waveguides, and/or other waveguiding structures. The optical guide extension 604 may have a composition that is different from or substantially similar to that of the coupled waveguides 102.

An optical guide extension 604 may affect the phase and/or amplitude of a signal, and in some examples, a phase shift applied to a signal 104 over a length of the optical guide extension 604 depends on the wavelength of the signal 104. Accordingly, a single optical guide extension 604 may produce a different phase adjustment to the first signal 104A than to the second signal 104B based on the differences in wavelength between the two signals. Additionally or in the alternative, attenuation of a signal 104 through the optical guide extension 604 may depend on the wavelength of the signal 104, and accordingly, a single optical guide extension 604 may produce a different amplitude change in the first signal 104A than in the second signal 104B based on the differences in wavelength between the two signals. In these examples and others, the optical delay element 602 applies an attribute-dependent adjustment to an input signal.

Referring next to FIG. 6B, the dispersive element 402 may include a ring resonator 606 that, in turn, includes a waveguide 102 in proximity to a resonator 608 (e.g., a substantially circular waveguiding structure). The waveguide 102 and the resonator 608 may be arranged close enough to have an optical coupling effect between the two. In that regard, when the waveguide 102 receives signals 104A and 104B, some portions of the signals are directed into the resonator 608.

The circumference and optical density of the resonator 608 may be configured so that the signals 104A and 104B constructively interfere with themselves each time they cycle inside the resonator 608. The optical coupling may also cause some portion of each signal in the resonator 608 to be directed back out into the waveguide 102. This portion may interfere with the portion of the input signal that remains in the waveguide 102 to produce the output signals 104. The nature of the interference in the resonator 608 and in the waveguide 102 may depend on attributes of the signals. Accordingly, the amplitude as well as the phase of an output signal may depend on properties of the respective input signal. In this way and others, the ring resonator 606 may have a different optical response to a first signal 104A than to a second signal 104B based on differences in properties of the signals such as wavelength.

Referring back to FIG. 3, the optical circuit 106 may also include other optical elements before and/or after the attribute-dependent adjustment element 302 such as an interferometer 304, examples of which are shown in the context of FIG. 7. The interferometer 304, such as a Mach-Zehnder interferometer, may receive a plurality of optical signals 104 as inputs and provide a plurality of optical signals 104 as outputs. The interferometer 304 may receive multiplexed signals 104, although only one set of optical signals 104 is shown for clarity. A first optical signal is indicated by reference number 104C, and a second optical signal is indicated by reference number 104D. The signals 104C and 104D may be associated with the same vector and have the same wavelength and/or polarization. The first optical signal 104C and the second optical signal 104D are directed towards a beam splitter 702. The beam splitter 702 may reflect some portion of the first optical signal 104C and transmit the remainder. The beam splitter 702 may also reflect some portion of the second optical signal 104D and transmit the remainder. As a result, the beam splitter 702 may produce two different signals 104E and 104F that are combinations of the input signals 104C and 104D.

The signal 104E includes the reflected portion of the first optical signal 104C plus the transmitted portion of the second optical signal 104D and may travel a first optical path 704 of the interferometer 304. The signal 104F includes the transmitted portion of the first optical signal 104C plus the reflected portion of the second optical signal 104D and may travel a second optical path 706 of the interferometer 304. Each optical path 704 and 706 may include various reflectors 708 (i.e., mirrors) to guide the respective signal and phase adjustors 710 (e.g., tunable phase shifting photonic crystals).

The optical paths 704 and 706 may guide the signals 104 to another beam splitter (i.e., a beam recombiner 710) that reflects a portion of the signals and transmits a remainder. This recombines the signals 104E and 104F to produce output signals labeled 104G and 104H. The output signals 104G and 104H of the interferometer 304 represent combinations (i.e., superpositions) of the input signals 104C and 104D. In particular, both phases and amplitudes of the output signals 104G and 104H are a function of the input signals 104C and 104D, and accordingly, the output signals 104G and 104H represent the result of applying mathematical operations to the values encoded in the input signals 104C and 104D.

These mathematical operations may be represented as matrix multiplication:

$$\begin{bmatrix} O_1 \\ O_2 \end{bmatrix} = \begin{bmatrix} C_{1,1} & C_{1,2} \\ C_{2,1} & C_{2,2} \end{bmatrix} \times \begin{bmatrix} I_1 \\ I_2 \end{bmatrix}$$

where $I_1$ and $I_2$ are the values of the input signals 104C and 104D, $O_1$ and $O_2$ are the values of the output signals 104G and 104H, and $C_{1,1}$ through $C_{2,2}$ are the mathematical operations applied by the interferometer 304. The particular operations of $C_{1,1}$ through $C_{2,2}$ may be selected by adjusting the lengths of the optical paths 704 and 706 or by configuring the phase adjustors 710, for example.

Referring back to FIG. 3, the combination of the attribute-dependent adjustment elements 302 and the interferometer 304 applies two distinct and different matrix operations to the two vectors encoded in the different optical signals 104. The first set of matrix operations may be represented as:

$$\begin{bmatrix} O_{A1} \\ O_{A2} \end{bmatrix} = \begin{bmatrix} A_{1,1} & A_{1,2} \\ A_{2,1} & A_{2,2} \end{bmatrix} \times \begin{bmatrix} I_{A1} \\ I_{A2} \end{bmatrix}$$

where $I_{A1}$ and $I_{A2}$ are the values of the input signals having a first attribute (e.g., a first wavelength or polarization), $O_{A1}$ and $O_{A2}$ are the values of the corresponding output signals, and $A_{1,1}$ through $A_{2,2}$ are the mathematical operations applied by the optical circuit 106. Similarly, the second set of matrix operations may be represented as:

$$\begin{bmatrix} O_{B1} \\ O_{B2} \end{bmatrix} = \begin{bmatrix} B_{1,1} & B_{1,2} \\ B_{2,1} & B_{2,2} \end{bmatrix} \times \begin{bmatrix} I_{B1} \\ I_{B2} \end{bmatrix}$$

where $I_{B1}$ and $I_{B2}$ are the values of the input signals having a second attribute (e.g., a second wavelength or polarization), $O_{B1}$ and $O_{B2}$ are the values of the corresponding output signals, and $B_{1,1}$ through $B_{2,2}$ are the mathematical operations applied by the optical circuit 106 that are distinct and may be different from $A_{1,1}$ through $A_{2,2}$. This principle may be expanded to apply to any number of vectors and sets of matrix operations.

Figure 8:
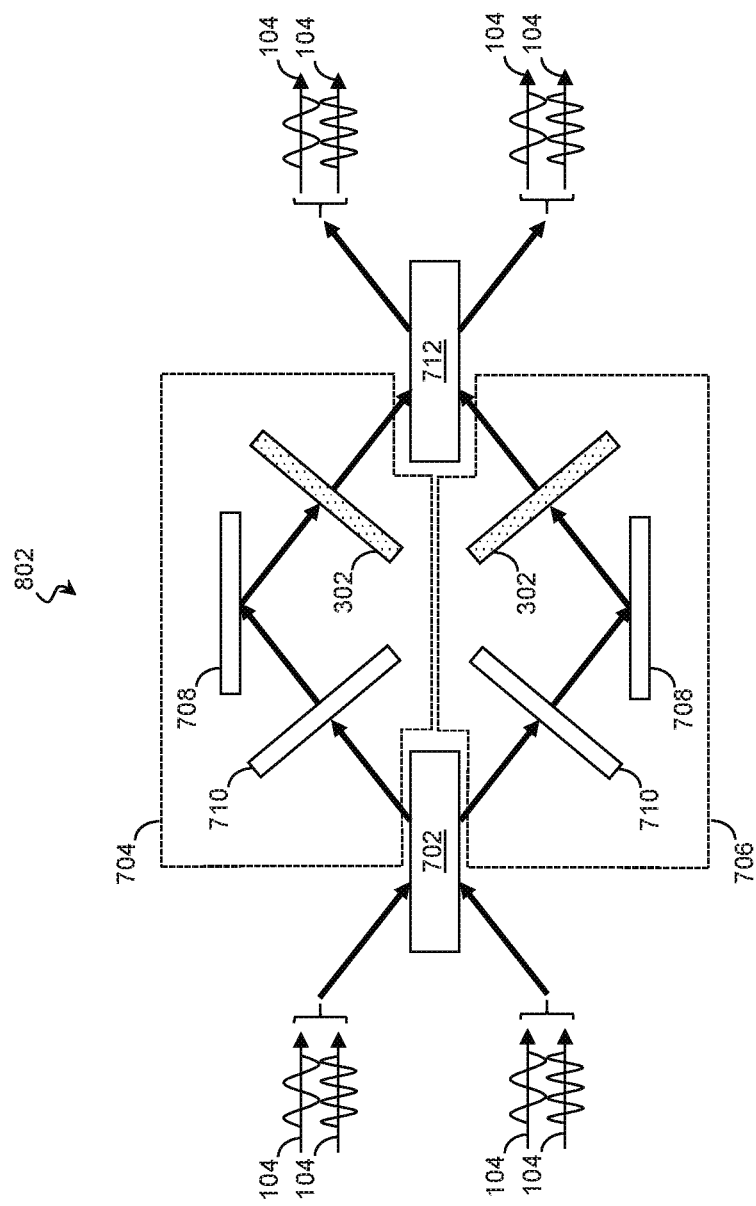
FIG. 8 is a block diagram of an interferometer that includes attribute-dependent adjustment elements according to some examples of the present disclosure.

While some of the above examples incorporate the attribute-dependent adjustment elements 302 before, between, and after the interferometers 304 of the optical circuit 106, in some examples, an attribute-dependent adjustment element 302 is included in an interferometer 304 itself. FIG. 8 is a block diagram of an interferometer 802 that includes attribute-dependent adjustment elements 302 according to some examples of the present disclosure. The interferometer 802 may be substantially similar to that of FIG. 7, in many regards. For example, the interferometer 802 may be representative of a Mach-Zehnder interferometer and may concurrently receive a plurality of multiplexed input signals 104. The input signals 104 may be directed to a beam splitter 702 that directs the input signals 104 along a plurality of optical paths 704 and 706 towards a beam recombiner 710. Each of the optical path 704 and 706 may include reflectors 708 and phase adjustors 710.

Each of the optical paths 704 and 706 may also include an attribute-dependent adjustment element 302 such as any of those described with reference to FIGS. 4-6. Incorporating attribute-dependent adjustment elements 302 within the interferometer 802 may cause the output signals 104 of the interferometer 802 to represent different superpositions of the input signals 104 based on a distinguishing attribute. In some examples, the attribute-dependent adjustment element 302 causes the interferometer 304 to apply a first mathematical operation to a first plurality of input signals 104 based on having a first wavelength and a different mathematical operation to a second plurality of input signals 104 based on having a second wavelength that is different from the first. By incorporating the interferometer 802 into the interferometer 304 of FIG. 3, for example, the optical circuit 106 of FIG. 3 may be configured to perform distinct attribute-dependent matrix operations on each of the plurality of input vectors as described in blocks 206 and 208, for example, with or without additional attribute-dependent adjustment elements 302.

Figure 9:
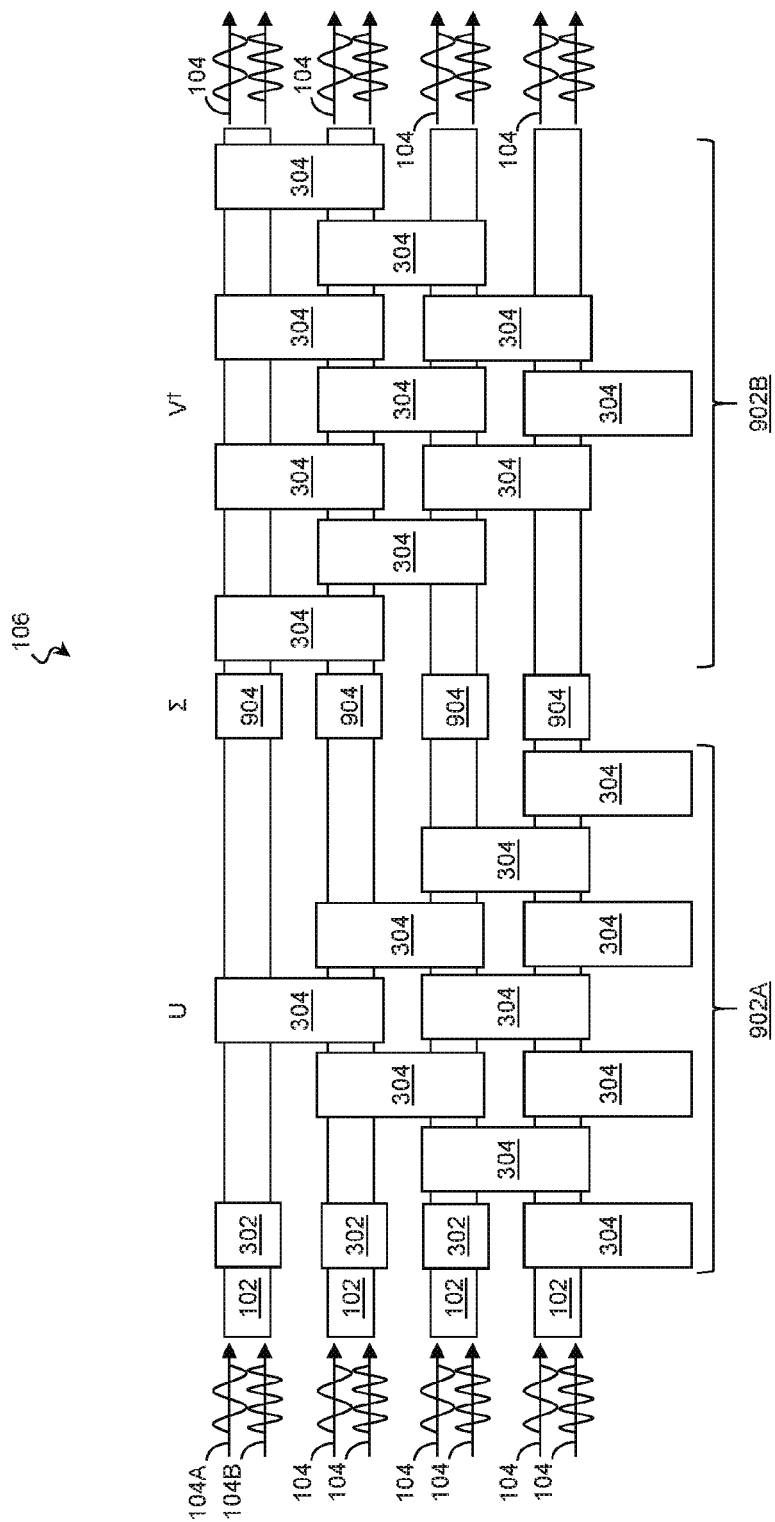
FIG. 9 is a block diagram of an optical circuit including interferometer networks according to some examples of the present disclosure.

Referring next to FIG. 9, the attribute-dependent adjustment elements 302 and/or interferometers 304 may be arranged in any number of networks in order to apply matrix operations to larger number of input optical signals 104. In that regard, FIG. 9 is a block diagram of an optical circuit 106 including interferometer networks according to some examples of the present disclosure. The optical circuit 106 is suitable for use as the optical circuit 106 of FIG. 1, and may include attribute-dependent adjustment elements 302 and/or interferometers 304 coupled by waveguides for carrying optical signals 104, each substantially as described above.

In the illustrated examples, the optical circuit 106 includes a first interferometer network 902A to apply a first matrix mathematical operation (designated U) and a second interferometer network 902B to apply a second matrix mathematical operation (designated $V^\dagger$).

In many examples, the interferometers 304 apply a unitary matrix operation because the power of the combined output signals 104 is substantially equal to the power of the combined input signals 104. To apply non-unitary matrix operations (e.g., matrix $\Sigma$), the optical circuit 106 may include other optical elements 904 such as tunable loss mechanisms to change the power of an input signal 104.

Accordingly, this portion of the optical circuit 106 applies the following mathematical operation:

$$O = V^\dagger \times \Sigma \times U \times I$$

where I represents an input vector of any suitable size, O represents a corresponding output vector of any suitable size, and $V^\dagger$, $\Sigma$, and U represent matrices that the input vector is multiplied by to obtain the output vector.

The optical circuit 106 may also include attribute-dependent adjustment elements 302 on at least some of the waveguides 102 before, between, and/or after the interferometers 304 and optical elements 904. As explained in detail above, the attribute-dependent adjustment elements 302 may apply different matrix operations to the values of the different signals 104 based on a distinguishing signal attribute. A first of these matrix operations may be represented as:

$$O_A = V_A^\dagger \times \Sigma_A \times U_A \times I_A$$

where $I_A$ represents a first vector encoded by signals having a first distinguishing attribute (e.g., a first wavelength or polarization) of any suitable size, $O_A$ represents a corresponding output vector of any suitable size, and $V_A^\dagger$, $\Sigma_A$, and $U_A$ represent matrices specific to the first distinguishing attribute that are applied to the first vector, $I_A$, to obtain the output vector $O_A$. A second of these matrix operations may be represented as:

$$O_B = V_B^\dagger \times \Sigma_B \times U_B \times I_B$$

where $I_B$ represents a second vector encoded by signals having a second distinguishing attribute (e.g., a second wavelength or polarization) of any suitable size, $O_B$ represents a corresponding output vector of any suitable size, and $V_B^\dagger$, $\Sigma_B$, and $U_B$ represent matrices specific to the second distinguishing attribute that are applied to the second vector, h. In this way, the optical circuit 106 may perform distinct and different matrix operations on the multiplexed signals 104.

The circuit 106 of FIG. 9 and elsewhere is suitable for applying a matched filter. In brief, a matched filter is a predetermined reference behavior or set of values that is applied to another set of data using convolution to determine the degree to which the set of data matches the predetermined reference. The matched filter may be convolved at different offsets (e.g., aligned at different points in time) to detect where the predetermined behavior is found within the set of data.

In some examples, the attribute-dependent adjustment elements 302 apply wavelength-dependent phase adjustments to the first set of signals that represent a first point in time and wavelength-dependent phase adjustments to the second set of signals that represent a second, different, point in time. In this way, the optical circuit 106 applies a first mathematical operation to the first vector that convolves the first vector with the matched filter at the first point in time, and concurrently applies a second mathematical operation to the second vector that convolves the second vector with the matched filter at the second point in time. By performing the operations concurrently, the optical circuit 106 parallelizes the convolution operations. Of course, the optical circuit 106 is equally suitable for other operations.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
providing, to a passive linear optical circuit, a first plurality of signals having a first optical property and encoding a first vector;
providing, to the passive linear optical circuit, a second plurality of signals having a second optical property and encoding a second vector, wherein the first optical property is different from the second optical property;
performing, via the passive linear optical circuit, a first attribute-dependent operation on the first plurality of signals to perform a first matrix multiplication operation on the first vector; and
concurrent with the first attribute-dependent operation, performing, via the passive linear optical circuit, a second attribute-dependent operation on the second plurality of signals to perform a second matrix multiplication operation on the second vector, wherein the first matrix multiplication operation and the second matrix multiplication operation are different based on the first optical property being different from the second optical property.

2. The method of claim 1,
wherein the first optical property includes a first wavelength,
wherein the second optical property includes a second wavelength, and
wherein the first matrix multiplication operation and the second matrix multiplication operation are different based on the first wavelength being different from the second wavelength.

3. The method of claim 1, wherein a first signal of the first plurality of signals and a second signal of the second plurality of signals are multiplexed and distinguishable based on the first optical property being different from the second optical property.

4. The method of claim 1, wherein the first attribute-dependent operation and the second attribute-dependent operation are performed by a common optical path through the passive linear optical circuit.

5. The method of claim 1, wherein performing the first attribute-dependent operation includes applying a first wavelength-specific phase adjustment to a first signal of the first plurality of signals and performing the second attribute-dependent operation includes applying a second wavelength-specific phase adjustment to a second signal of the second plurality of signals.

6. The method of claim 5, wherein the first wavelength-specific phase adjustment and the second wavelength-specific phase adjustment are applied by an optical delay element.

7. The method of claim 5, wherein the first wavelength-specific phase adjustment and the second wavelength-specific phase adjustment are applied by a photonic crystal.

8. The method of claim 5, wherein the first wavelength-specific phase adjustment and the second wavelength-specific phase adjustment are applied by a Mach-Zehnder interferometer.

9. The method of claim 5, wherein the first wavelength-specific phase adjustment and the second wavelength-specific phase adjustment are applied prior to providing the first signal and the second signal to a Mach-Zehnder interferometer.

10. The method of claim 5, wherein the first wavelength-specific phase adjustment and the second wavelength-specific phase adjustment are applied by a resonator.

11. An integrated circuit comprising:
a circuit of optical devices to receive a first signal and a second signal that is multiplexed with the first signal, wherein the circuit of optical devices includes:
an adjustment element to perform attribute-dependent operations on the first signal and the second signal concurrently; and
a second optical element to:
receive the first signal and the second signal with the attribute-dependent operations performed thereupon; and
apply an operation to each of the first signal and the second signal such that a first mathematical operation applied to a value of the first signal by the adjustment element and the second optical element is different from a second mathematical operation applied to a value of the second signal by the adjustment element and the second optical element.

12. The integrated circuit element of claim 11, wherein the attribute-dependent operations includes a first wavelength-specific phase adjustment applied to the first signal and a second wavelength-specific phase adjustment applied to the second signal.

13. The integrated circuit element of claim 11, wherein the adjustment element includes a device from a group consisting of: an optical delay element, a photonic crystal, a photonic crystal cavity, and a resonator.

14. The integrated circuit element of claim 11, wherein the second optical element includes a Mach-Zehnder interferometer.

15. The integrated circuit element of claim 11, wherein the adjustment element and the second optical element are to apply the first mathematical operation and the second mathematical operation along a common optical path.

16. The integrated circuit element of claim 11, wherein the first mathematical operation is associated with a convolution with a matched filter at a first convolutional offset and the second mathematical operation is associated with a convolution with the matched filter at a second convolutional offset that is different from the first convolutional offset.

17. An integrated circuit comprising:
an optical circuit to receive a first signal having a first wavelength and a second signal having a second wavelength that is different from the first wavelength, wherein the optical circuit includes:
a Mach-Zehnder interferometer to:
apply a first attribute-dependent matrix multiplication operation to a value encoded in the first signal based on the first wavelength; and
concurrently apply a second attribute-dependent matrix multiplication operation that is different from the first attribute-dependent matrix multiplication operation to a value encoded in the second signal based on the second wavelength.

18. The integrated circuit of claim 17, wherein the Mach-Zehnder interferometer includes a first optical path that includes a wavelength-dependent phase adjusting device.

19. The integrated circuit of claim 18, wherein the wavelength-dependent phase adjusting device is selected from a group consisting of: an optical delay element, a photonic crystal, a photonic crystal cavity, and a resonator.

20. The integrated circuit of claim 17, wherein the optical circuit is to receive the first signal and the second signal in a multiplexed form.

* * * * *